United States Patent
Matsuyama et al.

(10) Patent No.: US 6,829,420 B2
(45) Date of Patent: Dec. 7, 2004

(54) OPTICAL FIBER CABLE INCLUDING FREELY MOVABLE PLASTIC OPTICAL FIBERS

(75) Inventors: Yoshitaka Matsuyama, Kanagawa (JP); Seigo Kotera, Kanagawa (JP); Yoshinobu Takano, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/310,802

(22) Filed: Dec. 6, 2002

(65) Prior Publication Data

US 2003/0118298 A1 Jun. 26, 2003

Related U.S. Application Data

(63) Continuation of application No. PCT/JP01/04747, filed on Jun. 5, 2001.

(30) Foreign Application Priority Data

Jun. 6, 2000 (JP) .................................... 2000-168531

(51) Int. Cl.[7] .............................................. G02B 6/44
(52) U.S. Cl. .................................... 385/109; 385/105
(58) Field of Search ................................ 385/109, 110, 385/105

(56) References Cited

U.S. PATENT DOCUMENTS

| 4,796,970 A | * | 1/1989 | Reeve et al. ............... 385/109 |
| 4,815,814 A | * | 3/1989 | Ulijasz ....................... 385/114 |
| 4,902,096 A | * | 2/1990 | Calzolari et al. ........... 385/110 |
| 5,046,815 A | * | 9/1991 | Cain et al. .................. 385/101 |
| 5,668,912 A | * | 9/1997 | Keller ......................... 385/100 |
| 5,760,139 A |   | 6/1998 | Koike et al. ............... 525/199 |
| 6,086,999 A | * | 7/2000 | Ilvashenko ................. 428/375 |
| 6,132,650 A | * | 10/2000 | Nakamura ................. 264/1.29 |
| 6,271,312 B1 |  | 8/2001 | Koike et al. ............... 525/200 |
| 6,658,186 B1 | * | 12/2003 | Kristensen et al. ........ 385/110 |

FOREIGN PATENT DOCUMENTS

| JP | 60-60714 | 4/1985 |
| JP | 60-168116 | 11/1985 |
| JP | 7-72356 | 3/1995 |
| JP | 8-5848 | 1/1996 |
| JP | 9-197220 | 7/1997 |
| JP | 11-211954 | 8/1999 |
| WO | WO 01/92937 | 12/2001 |

OTHER PUBLICATIONS

Patent Abstracts of Japan, JP 09–197220, Jul. 31, 1997.

* cited by examiner

*Primary Examiner*—Hae Moon Hyeon
(74) *Attorney, Agent, or Firm*—Oblon, Spivak, McClelland, Maier & Neustadt, P.C.

(57) ABSTRACT

To provide an optical fiber cable having a plurality of GI-POFs and a resin cable body confining these, and excellent in the thermal durability, pressure resisting property and flexural mechanical property, wherein the increase of the attenuation of the light is suppressed. The resin cable body has as many holes as the number of the GI-POFs, extending longitudinally therethrough, and the GI-POFs are distributed and arranged one by one in the holes so that they are freely movable in two directions perpendicular to the longitudinal direction.

12 Claims, 4 Drawing Sheets

(b)

(c)

OPTICAL FIBER CABLE INCLUDING FREELY MOVABLE PLASTIC OPTICAL FIBERS

CROSS REFERENCE TO RELATED APPLICATION

This is a Continuation Application of PCT Application No. PCT/JP01/04747, filed on Jun. 5, 2001, which was not published under PCT Article 21(2) in English. This application is based upon and claims the benefit of priority from the prior Japanese Patent Application No. 2000-16853 1, filed on Jun. 6, 2000 the entire contents of which are incorporated herein by reference.

TECHNICAL FIELD

The present invention relates to an optical fiber cable for communication, having graded index type plastic optical fibers (hereinafter referred to as GI-POFs) and a resin cable body confining the GI-POFs.

BACKGROUND ART

Presently, optical fibers have been commonly employed to transmit a large volume of information at a high speed with reliability in the communication field.

The optical fibers include silica optical fibers, such as silica single-mode optical fibers, and resin optical fibers (plastic optical fibers). In particular, the plastic optical fibers have a larger diameter than the silica single-mode optical fibers and are excellent in flexibility, and accordingly, they are excellent in workability and safety at the time of end treatment and connection treatment during the installation of optical cables, and are useful.

Particularly, GI-POFs have high-speed large-volume transmitting capability and are expected to be optical fibers for the next generation communication.

The GI-POF is a plastic optical fiber, which is made to have an index distribution in the sectional direction. Namely, the GI-POF is constituted to have a refractive index distribution wherein the refractive index is high at the center in the sectional direction and decreases gradually, and accordingly, the light proceeding in the longitudinal direction in the GI-POF is concentrated in the vicinity of the center of the GI-POF by the effect of the refractive index. The high-speed large-volume transmitting capability is thereby achieved.

Thus, the high-speed large-volume transmitting capability of the GI-POF largely depends on the refractive index distribution, and in order to secure the transmitting capability of the Gi-POF, it is important to maintain the refractive index distribution to be a predetermined distribution.

Meanwhile, the production of an optical fiber cable of GI-POFs is carried out by covering and molding GI-POFs by extruding them together with a structural element, such as a tension member, for protection against tension, with e.g. a thermoplastic resin. During this covering and molding step, GI-POFs are likely to be affected by a heat of e.g. the thermoplastic resin melted at a high temperature. Accordingly, the physical properties of GI-POFs are likely to be deteriorated by the heat. Therefore, it is necessary to produce the cable so as not to be affected by the heat. As a typical method for producing a GI-POF, there is a method wherein a low molecular weight compound material having a different refractive index, is thermally diffused in a resin material to form a refractive index distribution to obtain a GI-POF.

With such a GI-POF, there is a possibility that due to the effect of the heat at the time of covering and molding to form a cable, the low molecular weight compound material is thermally diffused in the GI-POF, and the refractive index distribution is changed.

For example, in JP-A-11-211954, in order to prevent from increasing attenuation of GI-POF by the heat of melted covering resin material, a resin capable of being extruded at a relatively low temperature, such as polyethylene, is preliminarily extruded to cover the surface of GI-POFs and molded by means of a draw-down, whereby the GI-POFs are primarily covered and so-called jacket fibers are obtained. Thereafter, they are secondarily covered and molded by extruding them together with a structural element, such as a tension member, to produce an optical fiber cable of GI-POFs.

The structure of the optical fiber cable produced by such a method comprises, as an optical fiber cable 50 illustrated in FIG. 4(*a*), GI-POFs 51*a* and 51*b*, a primary covering layer 56 made of e.g. polyethylene, and a secondary covering layer 53 being the resin cable body made of e.g. a thermoplastic resin extruded to form the outermost layer.

Further, on the other hand, JP-U-60-60714 and JP-A-7-72356 propose a structure provided with a spacing between a covering resin material being the resin cable body and optical fibers, as illustrated in FIG. 4(*b*), or a structure provided with a spacing between a jacket fiber and a covering resin material as illustrated in FIG. 4(*c*). In FIG. 4(*b*), an optical fiber cable 60 is constituted by tension members 62*a* and 62*b*, a covering resin material 63 being the resin cable body, and a spacing 64 in which two optical fibers 67*a* and 67*b* are arranged. An optical fiber cable 70 illustrated in FIG. 4(*c*), is constituted by a covering layer 73 being the resin cable body made of e.g. a thermo-plastic resin extruded to form the outermost layer, a spacing 74 provided in the covering layer 73, and an optical fiber 78 arranged in the spacing and primarily covered with a covering layer 76.

However, the optical fiber cable of GI-POFs obtained by the production method described in JP-A-11-211954, has had the following problem:

Namely, in a jacket fiber which is a GI-POF smaller than 1 mm in diameter primarily covered with e.g. polyethylene, there has been a thermal durability problem such that in a high temperature durability test (at 70° C. for 24 hours), as the resin such as polyethylene being the covering material, is heat-shrunk, microbents are formed on the surface of the GI-POF, and consequently the attenuation is increased.

Further, in the optical fiber cable of GI-POFs having a structure wherein a spacing between the covering resin material and the optical fibers is provided as shown in JP-U-60-60714, a plurality of GI-POFs are present in a single hole, and there has been a problem in pressure resistance such that, when an external force is applied to the cable e.g. when it is stepped by e.g. a person, the plurality of optical fibers in the single hole are brought in contact with each other, pressed each other, and in the worst case, squashed each other or plastically deformed to increase the attenuation.

Further, in JP-A-7-72356, the increase of the attenuation which usually occurs due to flexing action at the time of bending, can be suppressed by making the unoccupied ratio of the optical fiber cable to be from 2 to 30%. However, the upper limit of the unoccupied ratio is limited from the viewpoint of easiness of attaching an optical connector when the optical connector is attached to the optical fiber cable.

And so, in a GI-POF for which a high-speed large-volume transmission capacity is required, there has been a problem in the mechanical property such that the increase of the attenuation due to flexing action at the time of bending, can not be suppressed to zero.

In order to solve the above problems, it is an object of the present invention to provide an optical fiber cable having a plurality of GI-POFs and a resin cable body confining the GI-POFs, and being excellent in the thermal durability, pressure resisting property and flexural mechanical property, whereby the attenuation does not increase.

DISCLOSURE OF THE INVENTION

The present invention provides an optical fiber cable having a plurality of GI-POFs and a resin cable body confining the GI-POFs, wherein the resin cable body has holes as many as the number of the GI-POFs, extending longitudinally therethrough, and the GI-POFs are distributed and arranged one by one in the holes so that they are freely movable in the respective holes.

Here, the movable range of the GI-POFs in the holes, is preferably at least twice as large as the diameter of the GI-POFs. The wall thickness of the resin cable formed by the plurality of holes, is preferably equivalent or larger than the diameter of the GI-POFs. And the wall thickness of the resin cable is preferably at least 0.5 mm.

Further, the plurality of holes are arranged in parallel, and the wall thickness at the central portion of the resin cable body, is preferably thicker than the wall thickness at both ends of the holes arranged in parallel and located at both ends. The hardness of the resin cable body is at most 50 by Shore D hardness.

Further, the GI-POFs are preferably of a perfluorinated type or a polymethyl methacrylate (PMMA) type. A tension member is preferably embedded in the resin cable body.

EXPLANATION OF NUMERIC SYMBOLS

Figure 1:
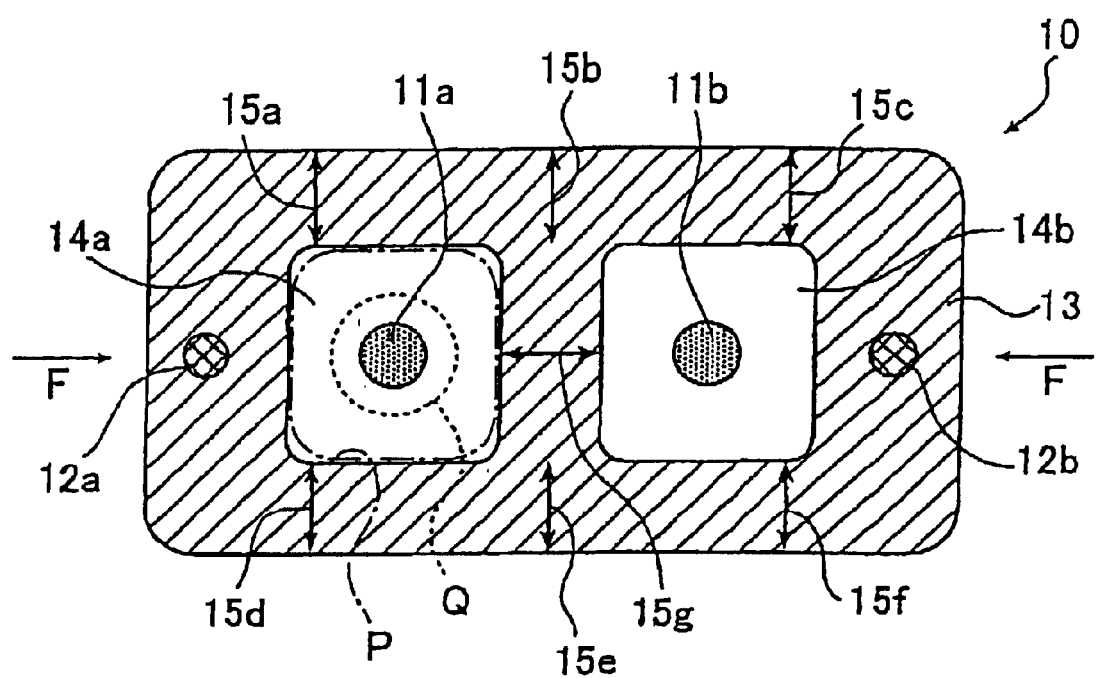
FIG. 1: A schematic cross-sectional view of an embodiment of the optical fiber cable of the present invention.

10: Optical fiber cable
11$a$ and 11$b$: GI-POF
12$a$ and 12$b$: Tension member
13: Resin cable
14$a$ and 14$b$: Hole
15$a$ to 15$g$: Wall thickness
20: GI-POF supplier
21: Tension member supplier
22: Covering die
23: Resin extruder
24: Cooling water bath
25: Retriever
34: Nipple
37$a$, 37$b$, 39$a$ and 39$b$: Nipple tip hole
38$a$ to 38$d$: Wall thickness
50, 60 and 70: Optical fiber cable
51$a$ and 51$b$: GI-POF
53: Secondary covering layer
56: Primary covering layer
62$a$ and 62$b$: Tension member
63: Covering resin material
64 and 74: Spacing
67$a$, 67$b$ and 78: Optical fiber
73 and 76: Covering layer

BEST MODE FOR CARRYING OUT THE INVENTION

Now, the optical fiber cable of the present invention will be described in detail with reference to a preferred embodiment shown in the drawings attached.

The optical fiber cable described below is a duplex flat optical fiber cable comprising two GI-POFs arranged in parallel and a tension member comprising two steel wires arranged outside of the GI-POFs to be resistant against tension. However, the optical fiber cable of the present invention is not limited to be such a duplex flat optical fiber cable, and may be an optical fiber cable having three or more GI-POFs and a resin cable confining the GI-POFs.

FIG. 1 shows an optical fiber cable (hereinafter referred to simply as cable) 10 employing perfluororesin type GI-POFs each having a fiber diameter of 500 $\mu$m, to which the optical fiber cable of the present invention is applied. Here, the perfluororesin type GI-POF is described in JP-A-8-5848. In the present invention, the optical fiber cable may be a PMMA type optical fiber cable using polymethyl methacrylate (PMMA) as the resin material.

Here, cable 10 comprises a pair of GI-POFs 11$a$ and 11$b$, tension members 12$a$ and 12$b$ having higher rigidity against tension than GI-POFs 11$a$ and 11$b$, and a resin cable body 13.

The resin cable body 13 is provided with holes as many as two GI-POFs 11$a$ and 11$b$, which are holes 14$a$ and 14$b$ extending longitudinally therethrough, and the GI-POFs 11$a$ and 11$b$ are distributed and arranged one by one in the respective holes 14$a$ and 14$b$ so that they are freely movable in two directions perpendicular to the longitudinal direction of the resin cable body 13.

Here, the holes 14$a$ and 14$b$ each has a rectangular shape as shown in FIG. 1, and the four corners of the rectangular shape are rounded to be arcuate. However, in the present invention, the shape of the holes is not limited to be a rectangular shape, and may be any shape such as a circular shape or an ellipsoidal shape as long as GI-POFs 11$a$ and 11$b$ are distributed and arranged one by one.

On the other hand, tension members 12$a$ and 12$b$ are embedded in the resin cable 13 outside of the holes 14$a$ and 14$b$, and arranged substantially in parallel to GI-POFs 11$a$ and 11$b$.

Here, primary covering usually provided with a resin material so as not to increase the attenuation due to e.g. thermal diffusion, is not provided in the cable 10 of the present embodiment, but in the present invention, there is no particular limitation as to the presence or absence of the primary covering. The material for tension members 12$a$ and 12$b$ are not particularly limited, and a metal wire or a wire material made of e.g. aramid fiber or FRP, may be mentioned for example, but a zinc-plated hard steel wire is preferred from a viewpoint of workability or economical efficiency.

The resin cable body 13 is made of a thermoplastic material and has a Shore D hardness of at most 50, preferably at most 40. As such a resin material, a soft polyvinyl chloride, a chlorinated polyethylene or a soft polyethylene may, for example, be used, but it is not limited thereto in the present invention. It may be any material so long as it is a resin material having a melting temperature of at most 135° C., preferably at most 130° C., as a temperature at the outlet port of the die at the time of the extrusion. If the melting temperature is at least 140° C., the refractive index distribution of GI-POF 11a or 11b may be changed by the heat, which may cause a significant increase of the attenuation.

Here, the wall thickness of the resin cable 13 formed by the holes 14a and 14b, namely the wall thickness at 15a, 15b, 15c, 15d, 15e, 15f and 15g in FIG. 1, is equivalent or larger than the diameter of GI-POFs 11a and 11b. When the diameter of GI-POFs 11a and 11b is for example 0.5 mm, the wall thickness is at least 0.5 mm, practically preferably at least 0.5 mm and at most 0.8 mm. The reason for so restricting the wall thickness at 15a, 15b, 15c, 15d, 15e, 15f and 15g, is to suppress the increase of the attenuation when a compressive load is applied to the cable 10 as an external force in the vertical direction in FIG. 1, holes 14a and 14b are squashed, and GI-POFs 11a and 11b are pinched between the respective inner walls of the holes 14a and 14b. Namely, the hardness of the resin cable 13 is at most 50 by Shore D hardness and is sufficiently softer than GI-POFs 11a and 11b, and the wall thickness of the resin cable 13 body is larger than the diameter of GI-POFs 11a and 11b. Therefore, GI-POFs 11a and 11b are embedded in the resin cable 13, the compressive load applied to GI-POF 11a or 11b will be eased, and as a result, no significant increase of the attenuation will be observed. Since GI-POFs 11a and 11b are separated by the resin cable 13, of course, no permanent deformation will be induced to the fibers due to their mutual contact, and accordingly, the increase of the attenuation by the permanent deformation will not be observed.

Here, the resin cable body 13 is preferably such that the wall thickness 15b and 15e at the central portion formed by arranging the holes 14a and 14b in parallel, is thicker than the wall thickness 15a, 15c, 15d and 15f at both ends of the hole 14a or 14b.

If the wall thickness 15b or 15e at the central portion is made to be thinner than the wall thickness 15a, 15c, 15d or 15f, when a compressive load F is applied in the transverse direction in FIG. 1, the resin cable body 13 will be bent and buckled to have a dogleg shape with the portion of the wall thickness 15b or 15e at the center so that the portions of wall thickness at 15a and 15c or the portions of wall thickness at 15d and 15f will meet each other. Consequently, the compressive stress applied to the hole 14a or 14b becomes non-uniform, and the spacing in the hole 14a or 14b will partially be squashed at the portion where the compressive stress is large. Here, if the GI-POF 11a or 11b is pinched between the walls where the spacing is squashed, the GI-POF 11a or 11b will receive a large compressive stress, and as a result, the refractive index will change and the attenuation will increase.

However, by making the wall thickness 15b and 15e of the resin cable 13 thicker than the wall thickness 15a, 15c, 15d and 15f, the optical fiber cable 13 will not be bent to have a dogleg shape, and the compressive stress will be uniformly applied to the inner walls of the holes 14a and 14b, and holes 14a and 14b will shrink uniformly. Accordingly, GI-POFs 11a and 11b will be embedded in the resin cable body 13 and will not receive a stress buffering, and as a result, the attenuation will not increase.

Further, the movable range for the GI-POFs 11a and 11b to freely move in the respective holes 14a and 14b, is at least twice, preferably at least twice and at most four times, as large as the diameter of GI-POFs 11a and 11b. Here, the movable range of GI-POFs being at least twice as large as the diameter of the GI-POFs, means a relation such that the movable range of the GI-POFs can include a circle having a diameter twice the diameter of GI-POFs. For example, in the cable 10 in FIG. 1, there is a relation such that the movable range P (the range surrounded by a chain line in FIG. 1) for GI-POF to freely move in the substantially rectangular cross section of the hole 14a, includes a circular range Q (the range surrounded by a dotted line in FIG. 1) defined by a circle having a diameter twice the diameter of GI-POF 11a or 11b.

Further, the unoccupied ratio, namely, the ratio of the area of hole 14a or 14b to the sectional area of GI-POF 11a or 11b, is at least 4 times and at most 25 times, preferably at least 9 times and at most 16 times. In order to increase the movable range or the unoccupied ratio, either the external dimension of the optical fiber cable has to be increased, or the wall thickness has to be reduced while maintaining the external dimension to be constant. However, if the wall thickness is reduced while maintaining the external dimension to be constant, bending of the optical fiber cable 10 is likely to occur as described above, and if the wall thickness is maintained to be constant, the external dimension has to be increased, which may cause a problem in the practical use. For this reason, the upper limits of the movable range and the unoccupied ratio are practically limited as described above.

Thus, within the above-mentioned range, GI-POFs 11a and 11b can freely move in the respective holes 14a and 14b, whereby GI-POFs 11a and 11b will have little frictional resistance with inner wall surfaces of the holes 14a and 14b even if the cable 10 is bent, and the increase of the attenuation due to the bending will rarely be observed. Further, in a high temperature-low temperature heat cycle test, if the movable range of GI-POFs 11a and 11b in the holes 14a and 14b, is at least twice the diameter of GI-POFs 11a and 11b, then GI-POFs 11a and 11b can move in the holes 14a and 14b even if the expansion or shrinkage of the tension members 12a and 12b or the resin cable 13, is different from that of GI-POFs 11a and 11b because of the difference in the linear expansion coefficient, whereby the compressive and tensile stresses to GI-POFs 11a and 11b due to the expansion or shrinkage, will be eased, and as a result, the increase of the attenuation will be suppressed.

Cable 10 is constituted as described above.

Now, the method of producing such a cable 10 will be described based on FIG. 2.

The method of producing the cable 10 is such that at first, GI-POFs 11a and 11b reeled out via a GI-POF supplier 20, and tension members 12a and 12b reeled out via a tension member supplier 21 are inserted into nipple conduits (not shown) of a covering die 22. Then, they are combined with the thermoplastic resin material of the resin cable body 13 extruded by a resin extruder 23, at a nipple 34 (see FIG. 3) at the forward end of the covering die 22, formed into a shape of the cable at the outlet of the covering die 22, and cooled in the cooling water bath 24.

Here, the tension applied to GI-POFs 11a and 11b at the time of reeling out, is preferably from 5 to 100 g, and if it exceeds 100 g, significant stretch of GI-POFs 11a and 11b will occur, and it may cause an increase of the attenuation. On the other hand, if it is less than 5 g, vibration deflection of GI-POFs 11a and 11b will occur, and they will contact the covering die 22 body and the resin just after the outlet of the covering die 22, to receive a heat damage thus leading to a significant increase of the attenuation. In order to further reduce the increase of the attenuation, the tension is preferably from 20 to 60 g, and the inserting point of GI-POFs 11a and 11b is preferably adjusted to a position where GI-POFs 11a and 11b will not contact the covering die 22 and the resin just after the molding.

The molding speed is adjusted by the retrieving speed, and it is adjusted to the speed whereby the temperature of GI-POFs 11a and 11b located in the holes 14a and 14b of the cable 10 at the outlet of the covering die 22, does not exceed an allowable heat resisting temperature of 70° C. If the molding is carried out at a resin temperature higher than the allowable heat resisting temperature, heat stretch of GI-POFs and significant deterioration of the attenuation will be caused. The temperature of GI-POFs 11a and 11b at the outlet of the die is preferably controlled to be a temperature lower by at least 20° C. than the allowable heat resisting temperature, and is, in this embodiment, more preferably from 40 to 50° C.

The increase of the attenuation is suppressed by cooling the temperature by city water, and the increase of the attenuation can be more stably suppressed by quick cooling at from 5 to −20° C.

Figure 3:
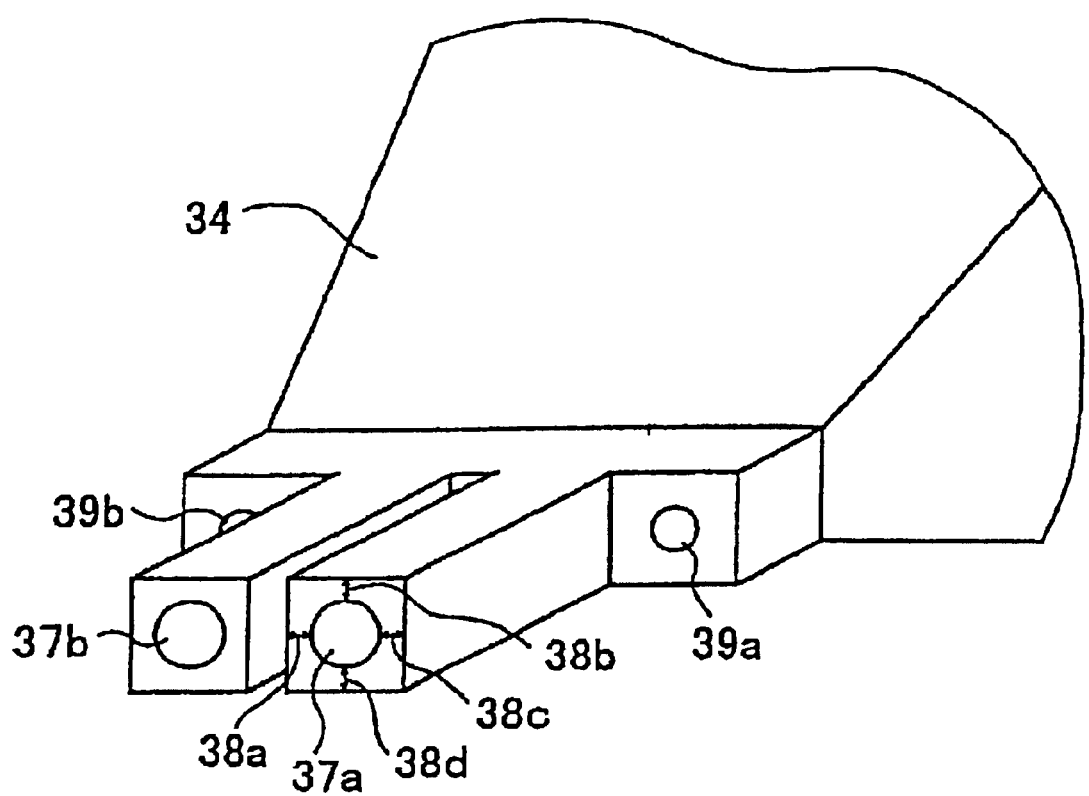
FIG. 3: A schematic view of the tip portion of the nipple of the covering die used for producing an embodiment of the optical fiber cable of the present invention.

FIG. 3 shows the structure of the nipple 34 at the forward end of the covering die 22. GI-POFs 11a and 11b pass through nipple tip holes 37a and 37b respectively and tension members 12a and 12b pass through nipple tip holes 39a and 39b respectively. The resin material of the resin cable body 13 is extruded so as to surround the periphery of nipple 34, and molded into a predetermined cable shape.

Here, the diameter of the nipple tip holes 37a and 37b are preferably at least 1.5 times the diameter of GI-POFs 11a and 11b, and if the hole size is less than 1.5 times, GI-POFs 11a and 11b will contact the inner wall of the nipple holes, and a significant increase of the attenuation will be caused. For example when the diameter of GI-POFs 11a and 11b is 0.5 mm, the wall thicknesses 38a to 38d of the tip portion of nipple 34, is preferably at least 0.35 mm, more preferably 0.50 mm. If the wall thicknesses 38a to 38d are thin, GI-POFs 11a and 11b will be likely to contact the resin inner walls of the holes 14a and 14b in the cable 10, and since the distance to the resin just after the molding becomes short, they will be likely to receive a thermal damage by radiation, which will cause the increase of the attenuation.

The external shape of cable 10 and the shape of holes 14a and 14b are similar to the die external shape and the nipple tip shape, respectively. The external dimension of the cable 10 and the hole dimension of the holes 14a and 14b can be adjusted to be a desired dimensions by adjusting the extrusion amount of the resin and the retrieving speed.

With respect to such an optical fiber cable of the present invention, the attenuation of the optical fiber cable having one pair of GI-POFs and tension members, was investigated.

Here, the following materials were used in the Examples described below unless otherwise specified.

GI-POF: perfluorinated GI-POF, having a fiber diameter of 500 μm, "Lucina" manufactured by Asahi Glass Company, Limited Tension member: zinc-plated hard steel wire, having a wire diameter of 0.4 mm Resin cable material: soft vinyl chloride, having a shore D hardness of 30 (shore A hardness of 80), manufactured by Riken Technos Corporation.

Figure 2:
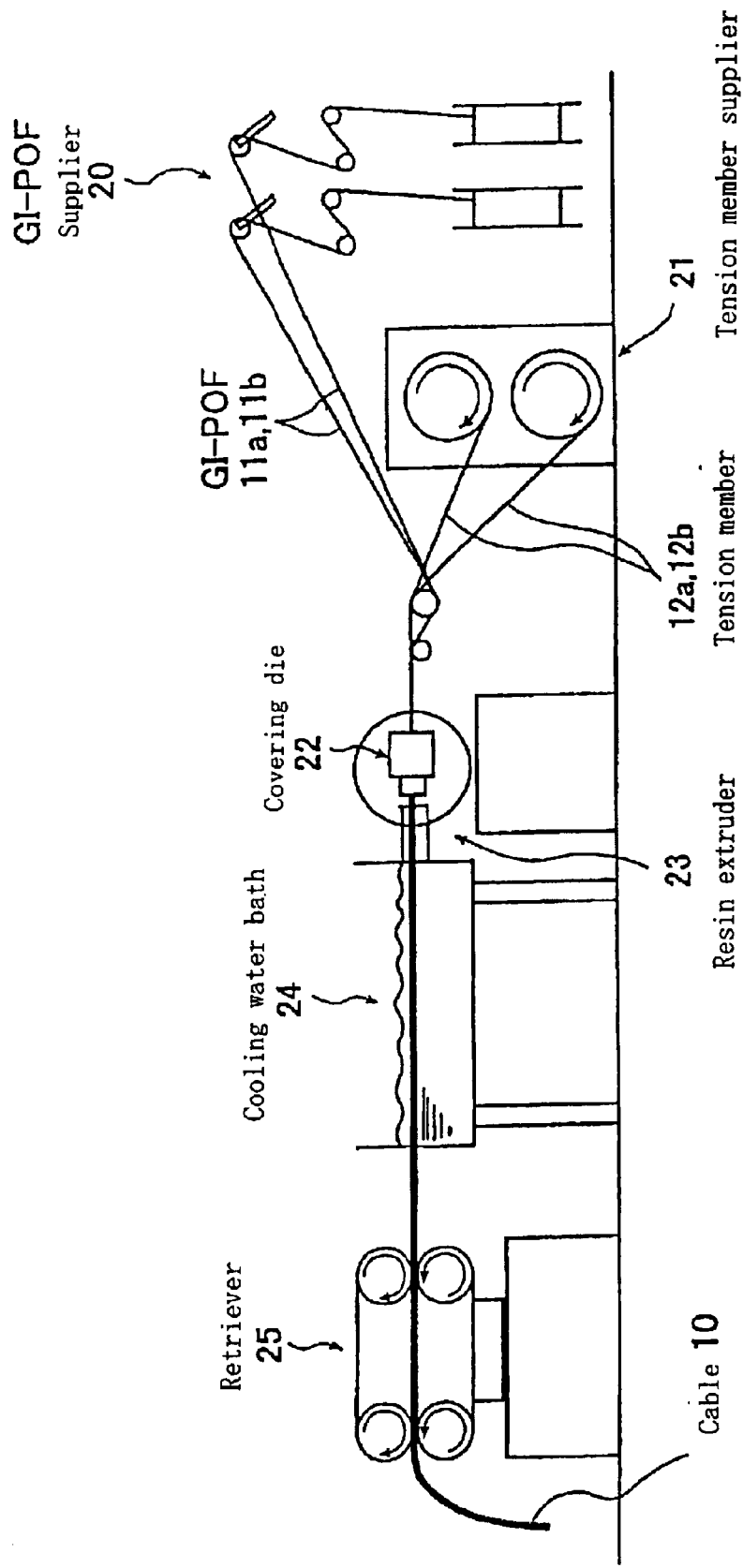
FIG. 2: A schematic view of a manufacturing line of an embodiment of the optical fiber cable of the present invention.

The producing method was based on the producing method by extrusion as shown in FIG. 2 and FIG. 3. Except for Example 4 and Example 5, the increase of the attenuation of GI-POF due to the production of the optical fiber cable, was approximately 0 dB/km. Further, with respect to evaluation of the optical fiber cable, the compressive load test, cyclic flex and cord bending were carried out based on the methods described in JIS C6836 "All plastic multi mode optical fiber cords". The heat cycle test is an evaluation after carrying out 10 cycles of a temperature cycle of from −20° C. to 70° C. in 4 hours. The measurement of the attenuation of GI-POF was carried out by 2 m cut-back method using the 850 nm LD. The attenuation at the time of the compressive load test was carried out by continuous measurement using the 850 nm LD.

EXAMPLE 1

Cable 10 was produced wherein the cross sectional shape of each hole was a substantially rectangular shape, the movable distance in both the vertical and horizontal directions of the GI-POF in the hole was 1.9 mm i.e. 3.8 times the diameter of the GI-POF, the wall thickness 15b and 15e at the central portion of the resin cable body 13 was 0.8 mm, the wall thickness 15a, 15c, 15d and 15f at the ends of the holes 14a and 14b located at both ends, was 0.6 mm, and the wall thickness 15g between the holes 14a and 14b was 0.6 mm.

EXAMPLE 2

Cable 10 was produced wherein the cross sectional shape of each hole was a substantially rectangular shape, the movable distance in the vertical and horizontal directions of the GI-POF in the hole was 1.9 mm i.e. 3.8 times the diameter of the GI-POF, the wall thickness 15b and 15e at the central portion of the resin cable body 13 was 0.5 mm, the wall thickness 15a, 15c, 15d and 15f at the ends of the holes 14a and 14b located at both ends, was 0.6 mm, and the wall thickness 15g between the holes 14a and 14b was 0.6 mm.

EXAMPLE 3

Cable 10 having the same cable dimensions as in Example 2, was produced employing a soft vinyl chloride having a Shore D hardness of 43 (Shore A hardness of 95) as the covering resin.

EXAMPLE 4

Cable 10 was produced wherein the cross-sectional shape of each hole was a substantially rectangular shape, the movable distance in both the horizontal and vertical directions of the GI-POF in the hole was 1.2 mm i.e. about 2.4 times the diameter of the GI-POF, the wall thickness 15b and 15e at the central portion of the resin cable body 13 was 0.5 mm, the wall thickness 15a, 15c, 15d and 15f at the ends of the holes 14a and 14b located at both ends, was 0.6 mm, the wall thickness 15g between the holes was 0.6 mm. The increase of the attenuation of GI-POF due to the production was observed to be from 10 to 20 dB/km.

EXAMPLE 5

A cable was produced so that the cross-sectional shape of each hole was a substantially rectangular shape, the movable distance in both the vertical and horizontal directions of the GI-POF in the hole was 0.8 mm i.e. about 1.6 times the diameter of GI-POF, the wall thickness of the resin cable body was 0.5 mm at the central portion, and 0.6 mm at the cable ends, and the wall thickness between the holes was 0.6 mm. The increase of the attenuation of GI-POF due to the production was from 50 to 100 dB/km.

EXAMPLE 6

A cable having the same cable dimensions as in Example 2, was produced employing a soft vinyl chloride having a shore D hardness of 55.

EXAMPLE 7

Figure 4A:
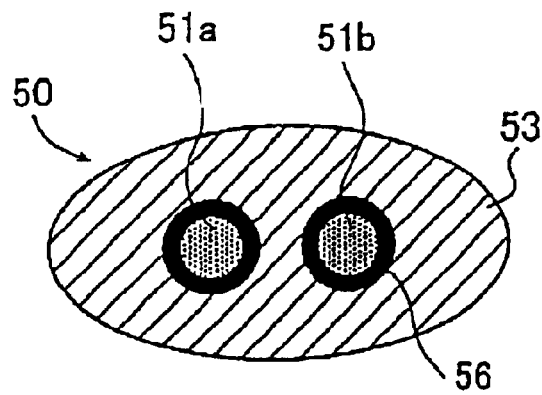
FIG. 4: Views (a) to (c) are schematic cross-sectional views of conventional optical fiber cables.
Figure 4A:
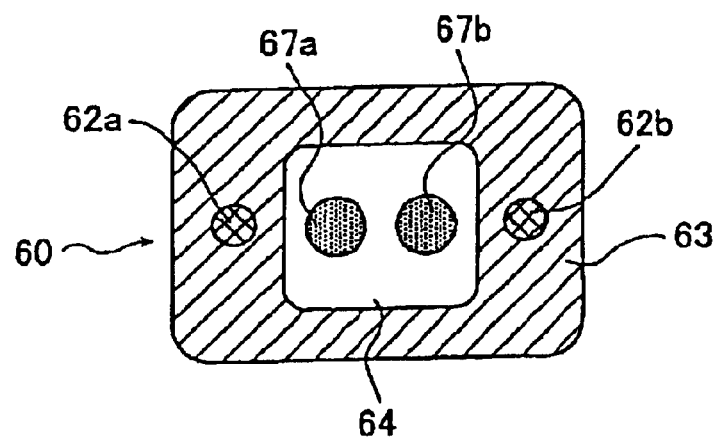
Figure 4A:
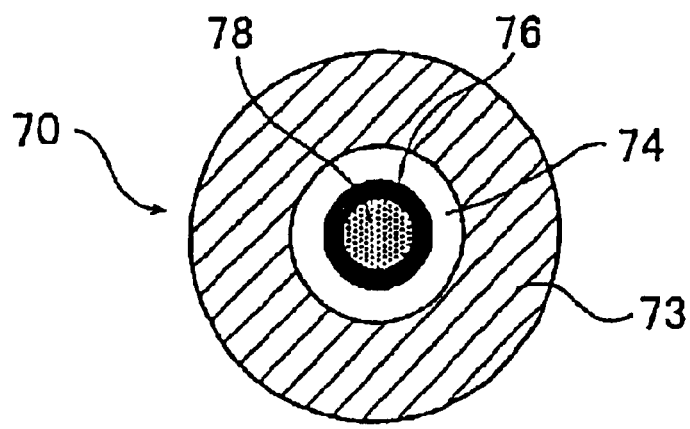

Cable 60 was produced to have a construction as shown in FIG. 4(b), wherein GI-POF optical fibers 67a and 67b were arranged in the same hole wherein the movable distance of GI-POFs was 2 mm i.e. 4 times the diameter of GI-POFs, and the wall thickness of the resin cable body was 0.5 mm at the central portion and 0.6 mm at the ends.

The criterion of the evaluation of resistance to compressive load is that the increase of the attenuation one minute after the release of the load (after the release of the load) is at most 0.2 dB as compared with that before the test. As shown in Table 1, the cables in Example 1, Example 2 and Example 3 satisfy the criterion. Further, by adjusting the wall thickness as in the case of resin cable body 13 in Example 1, the increase of the attenuation by an application of a load, can be suppressed and the resistance to compressive load can be further improved. The Shore D hardness of the resin cable body 13 is 43 in Example 3, which is acceptable, but it is 55 in Example 6, which exceeds the criterion.

Table 2 shows the movable distances of GI-POFs in the holes (in each parenthesis, a value obtained by dividing the movable distance by the diameter of GI-POF is shown) and various properties. In Example 1 and Example 4, the results of cyclic flex and cord bending satisfy the evaluation criterion that is at most 0.2 dB of the increase of the attenuation as measured before and after the test. The heat cycle results are also within the allowable range, but Example 5 did not satisfy the evaluation criterion of the bending, and the attenuation significantly increased at the time of production.

TABLE 1

|  | GI-POF | Hardness of Covering | Resistance to compressive load [dB] | |
| --- | --- | --- | --- | --- |
|  | Movable distance [mm] | Resin [Shore D hardness] | On load | After load is released |
| Ex. 1 | 1.9 (3.8) | 30 | 0.5 | 0 |
| Ex. 2 | 1.9 (3.8) | 30 | 5.0 | 0.1 |
| Ex. 3 | 1.9 (3.8) | 43 | 6.5 | 0.2 |
| Ex. 6 | 1.9 (3.8) | 55 | 8.0 | 1.0 |
| Ex. 7 | 2.0 (4.0) | 30 | 30.0 | 20.0 |

TABLE 2

|  | GI-POF Movable distance [mm] | Cyclic flex [dB] | Cord bending [dB] | Heat cycle [dB/km] |
| --- | --- | --- | --- | --- |
| Ex. 1 | 1.9 (3.8) | 0 | 0 | 5.0 |
| Ex. 4 | 1.2 (2.4) | 0.1 | 0.1 | 7.3 |
| Ex. 5 | 0.8 (1.6) | 1.5 | 3.5 | 12.5 |

From the above results, it is evident that by distributing and arranging GI-POFs 11a and 11b in the plurality of holes 14a and 14b provided in the resin cable body 13, so that the GI-POFs freely move in the holes, the resistance to compressive load was improved. Further, it was found that by making the wall thickness of the resin cable body 13 at the central portion thicker than that at both ends, and by making the Shore D hardness at most 50, the resistance to compressive load improves.

Further, by making the movable range for GI-POFs 11a and 11b to freely move in the respective holes 14a and 14b, at least twice the diameter of GI-POFs 11a and 11b, the increase of the attenuation at the time of production was suppressed, and the increase of the attenuation by the cyclic flex, cord bending or heat cycle, was suppressed.

In the foregoing, the optical fiber cable of the present invention has been described in detail. However, the present invention is by no means limited to the above-mentioned embodiments, and it is a matter of course that various improvements or modifications can be made within the range not departing from the gist of the present invention.

INDUSTRIAL APPLICABILITY

As described in detail in the foregoing, in the optical fiber cable having a plurality of GI-POFs and a resin cable body confining the GI-POFs, the GI-POFs are distributed in the holes formed in the resin cable body respectively so that they can freely move in the holes, whereby an optical fiber cable excellent in the resistance to compressive load, the resistance to compressive load, the mechanical property and heat durability without requiring any primary covering of GI-POFs with a resin, can be provided.

The entire disclosure of Japanese Patent Application No. 2000-168531 filed on Jun. 6, 2000 including specification, claims, drawings and summary is incorporated herein by reference in its entirety.

What is claimed is:

1. An optical fiber cable comprising:

first and second plastic optical fibers; and a resin cable body defining first and second holes, the first and second plastic optical fibers disposed and freely movable in the respective first and second holes, wherein the first and second holes each comprise opposite parallel flat surfaces configured to permit the holes to shrink uniformly.

2. The optical fiber cable according to claim 1, wherein at least one of the first and second holes is configured to have a movable range at least two times a diameter of the first or second plastic optical fiber disposed therein.

3. The optical fiber cable according to claim 1, wherein a thickness of a wall of the resin cable body adjacent one of the first and second holes is at least as large as a diameter of the first or second plastic optical fiber disposed therein.

4. The optical fiber cable according to claim 3, wherein the thickness is at least 0.5 mm.

5. The optical fiber cable according to claim 1, wherein the first and second holes are disposed parallel to one another and to a length of the resin cable body, and a thickness at the central portion of the resin cable body is greater than thicknesses at ends in walls adjacent the first and second holes.

6. The optical fiber cable according to claim 1, wherein the resin cable body has a hardness of at most 50 by Shore D hardness.

7. The optical fiber cable according to claim 1, wherein at least one of the first and second plastic optical fibers comprises a perfluorinated or a polymethyl methacrylate fiber.

8. The optical fiber cable according to claim 1, further comprising:

a tension member disposed in the resin cable body.

9. The optical fiber cable according to claim 1, wherein at least one of the first and second holes has a radiused corner.

10. The optical fiber cable according to claim 9, wherein the one of the first and second holes has four radiused corners.

11. The optical fiber cable according to claim 1, wherein a cross sectional area of one of the first and second holes unoccupied by the first or second optical plastic fiber disposed therein is between about 4 and about 25 times a cross sectional area of the first or second optical fiber disposed therein.

12. The optical fiber cable according to claim 1, wherein a cross sectional area of one of the first and second holes unoccupied by the first or second optical plastic fiber disposed therein is between about 9 and about 16 times a cross sectional area of the first or second optical fiber disposed therein.

* * * * *